June 1, 1937.   L. R. LUDWIG ET AL   2,082,015

ELECTRIC VALVE CONVERTING SYSTEM

Filed Oct. 30, 1935   2 Sheets-Sheet 1

WITNESSES:
Michael Stark
S. A. Strickler

INVENTORS.
Leon R. Ludwig and
Herbert A. Rose
BY O. B. Buchanan
ATTORNEY

June 1, 1937.  L. R. LUDWIG ET AL  2,082,015

ELECTRIC VALVE CONVERTING SYSTEM

Filed Oct. 30, 1935   2 Sheets-Sheet 2

WITNESSES:
Michael Stark
S. A. Stricklett

INVENTORS.
Leon R. Ludwig and
Herbert A. Rose.
BY O. B. Buchanan
ATTORNEY

Patented June 1, 1937

2,082,015

UNITED STATES PATENT OFFICE 2,082,015

ELECTRIC VALVE CONVERTING SYSTEM

Leon R. Ludwig, Forest Hills, and Herbert A. Rose, Pittsburgh, Pa., assignors to Westinghouse Electric & Manufacturing Company, East Pittsburgh, Pa., a corporation of Pennsylvania Application October 30, 1935, Serial No. 47,454

14 Claims. (Cl. 175—363)

Our invention relates to an electric valve converting system, and particularly to a converting system for improving the operating conditions of the individual valves of the converter circuit.

Valve type converting equipment as now constructed has several distinct disadvantages, particularly when the converter is supplying current to rotating or other machines having a back voltage characteristic. For example, in the present type of converter equipment, at the time when a given valve ceases to be conducting, the current therethrough rapidly falls to zero and high inverse potential is applied in approximately 100 micro-seconds. The result of this rapid transition from a conducting to an insulating condition of the valve is a high probability of backfire.

In certain types of valves such as hot cathode and make-alive type valves, almost the entire danger of backfire is present only because of this unfavorable transition condition.

Tests with make-alive valves have shown that when the valves are supplying current to a substantially pure resistance type load, they will carry without backfire approximately four times the amount of current that they would carry without backfire when supplying current to a machine or other inductive load.

Other disadvantages of present valve type conversion circuits are operation at poor power factor on the alternating current side and a poor wave form of both current and voltage.

It is accordingly an object of our invention to provide converter equipment that will improve the wave form of both voltage and current when converting power between two circuits, one of which is an alternating current circuit.

A further object of our invention is to provide converter equipment which will improve the power factor on the alternating current side of the device with a minimum of equipment.

It is a further object of our invention to accomplish this improvement in power factor by supplying the wattless power demanded by the alternating current system by means of auxiliary apparatus operating at harmonic frequency.

It is a still further object of our invention to improve the commutating condition of the individual valves of the converting apparatus.

Associated with this improvement is an alternation of the wave form of the current through a particular valve in such a manner that the current will slowly approach zero at the end of a conductive period and inverse voltage will be slowly applied to the valve. This alternation of the transition condition of the valve results in a reduction of the backfire probability which permits a material increase in the power rating of the valve device.

In general, a converter according to our invention utilizes a plurality of electric valves divided into a plurality of groups which are fed by a plurality of phase winding groups which are caused to operate in parallel but with a phase displacement between them.

In this respect, our converting system is similar to a double three-phase, or, in general, a double n-phase system. It differs, however, from the conventional conversion system in that the working current is not at any given instant equally divided between the two parallel operating component parts of the system. This current distribution will vary with time such that first substantially all of the direct current will be caused to flow in one phase group, while commutation takes place between the valves associated with the other phase group. Following this commutation, the direct current will be transferred from the first mentioned phase group to the second phase group, and then commutation will be effected. This may be termed "criss-cross" commutation.

Such an effect could be accomplished by shifting the tap on the interphase transformer of a normal double n-phase rectifying system, with harmonic frequency. It is more easily accomplished, however, by the use of separate conversion apparatus for supplying the harmonic power to the interphase winding. The general principle involved may be stated as follows: In a rectifier the objects of the invention are fulfilled by withdrawing real harmonic power from the intermediate transformer, and in the inverter they are fulfilled by supplying real hormonic power.

Other objects and advantages of our invention will be apparent from the following detailed description taken in conjunction with the accompanying drawings in which.

Figure 1:
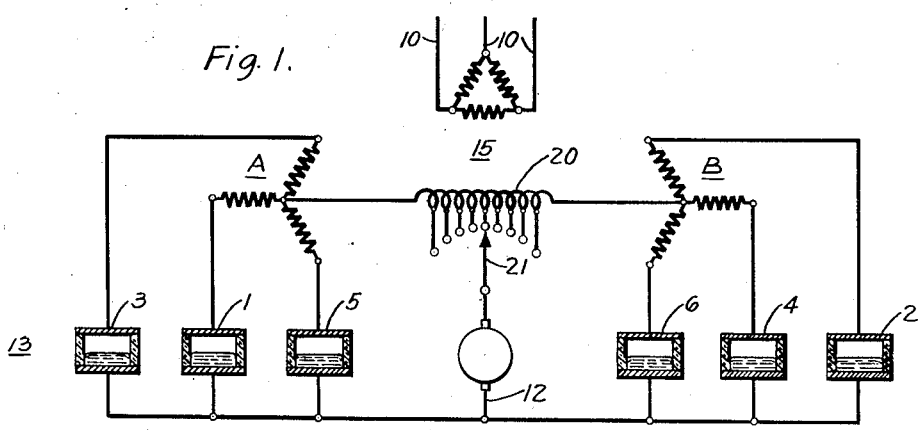
Figure 1 is a schematic illustration of a converter system embodying our invention.

The operation of our conversion system is most easily understood from a simplified embodiment such as that disclosed in Fig. 1 in which the direct current energy is supplied from an alternating current circuit 10 to a direct current load circuit 12 by means of a polyphase valve type converter 13 having a plurality of valves 1, 2, 3, 4, 5, 6 divided into two groups which are, in turn, supplied from two groups A—B of phase windings in a transformer 15 connecting the direct current circuit 12 and alternating current circuit 10, the two secondary phase winding groups A—B of the transformer 15 being connected through a suitable interphase transformer 20. As described, this construction is similar to the usual double n-phase converter connection, in which at least one anode of each group is constantly carrying current and the currents in the two sides are constantly kept equal by means of the interphase transformer 20. However, we propose to operate this double n-phase group differently. In fact, not to cause the load current to divide equally into the phase groups but to swing first substantially entirely into group A, at which time group B will commutate; for instance, valves 3 and 5 will commutate while substantially all of the current is flowing in group B. Then the current will be swung substantially entirely into group A, at which time the succeeding valves 4 and 6 in group B will commutate. In other words, we will use the principle of double commutation or commutating both between groups and between anodes of the group.

To cause this criss-cross, or double commutation to take place, we may vary the position of the tap 21 on the interphase transformer 20 in the proper time relation, moving it back and forth from the opposite terminals of the interphase transformer like a pendulum. A little study shows that if this is done, we are, in reality, rectifying a triple frequency input to the interphase transformer, that is, taking real power from it and supplying this real power to the direct current circuit 12. Thus, we state the general proposition that to correct power factor, improve wave form and cause the valves to operate with a resistance type transition, real harmonic power must be taken from the interphase transformer in case the converter is supplying power from an alternating current to a direct current circuit, or in the event the converter is supplying power from a direct current to an alternating current circuit, real power must be supplied to the interphase transformer.

Figure 2:
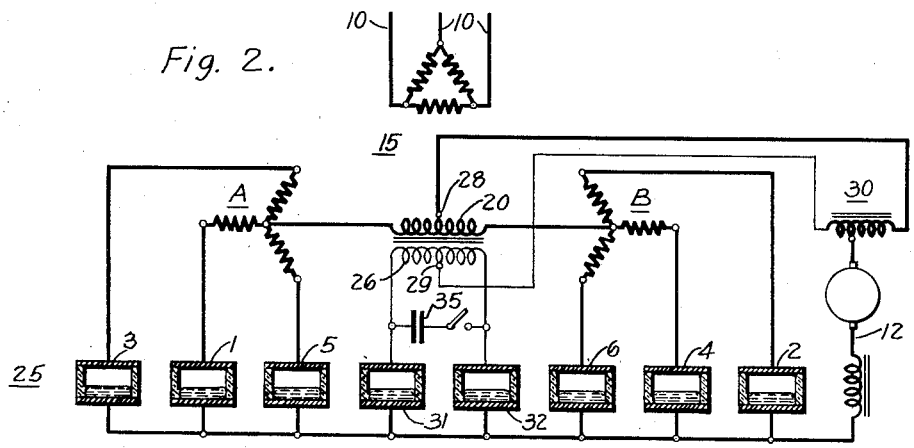
Fig. 2 is a similar view of a preferred embodiment of our invention.

A preferred embodiment of our invention is disclosed in Fig. 2 in which the transfer of real power between the interphase transformer 20 and one of the connected circuits is accomplished by means of an auxiliary valve type converter 25. While the necessary energy may be transferred from the interphase transformer 20 to either the alternating current 10 or direct current circuit 12; for purposes of simplicity of illustration we have shown the auxiliary converter 25 as delivering power from the interphase winding 20 to the direct current circuit 12. We prefer to provide a secondary winding 26 on the interphase transformer 20 so that potential taken from the interphase winding 20 is of the correct value to be supplied to the direct current circuit 12. However, instead of using a separate winding 26 as shown, the interphase winding 20 may be in the form of an autotransformer. Preferably, the midpoints 28—29 of the main interphase transformer winding 20 and the auxiliary interphase winding 26 are connected by means of an auxiliary reactor 30 which is tapped in such a manner that current flowing from the return lead of the direct current circuit 12 to the interphase winding 20 and the auxiliary winding 26 will be in proportion to the power supplied from the main windings and the power supplied from the auxiliary winding 26. However, if desired, this auxiliary reactor 30 may be dispensed with and the midpoints 28—29 of the two windings 20—26 directly connected together.

When the conversion system according to our invention is utilized to supply power to the direct current circuit 12, the auxiliary valves 31—32 act as a rectifier and take power at harmonic frequency from the interphase winding 20 and in effect produces a shifting of the interphase voltage to produce the desired criss-cross commutation. When operating to convert energy from a direct-current circuit 12 to an alternating current circuit 10, the valves 31—32 operate to transfer energy from the direct current circuit 12 to an interphase winding 20, and consequently to the alternating current circuit 10. The wattless power necessary in the alternating current circuit 10 is provided by means of a capacitor 35 connected across the auxiliary interphase winding 26. Since this auxiliary interphase winding operates at harmonic frequency, it follows that the wattless power for the alternating current circuit 10 is supplied at harmonic frequency with a consequent reduction in the size of the capacitor 35 needed for producing the wattless power required in the alternating current circuit 10.

Figure 3:
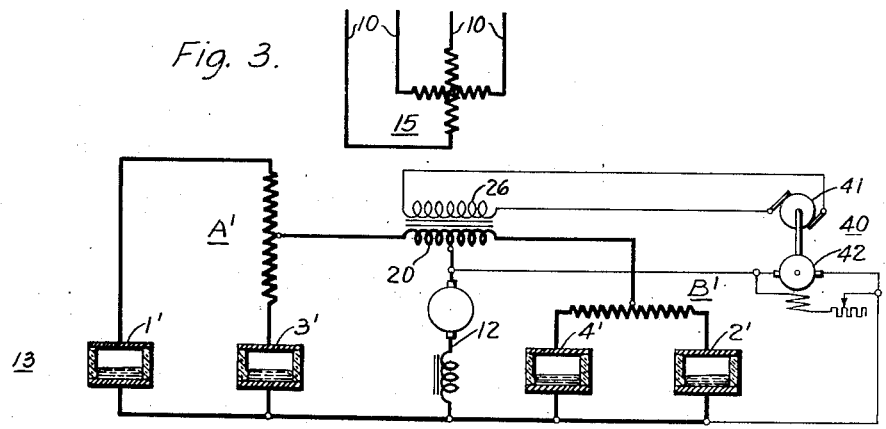
Fig. 3 is a similar view showing modified means for accomplishing the criss-cross commutation.

While we prefer to use a valve type converter for transferring harmonic power to the interphase transformer, it is possible to use any suitable power converting equipment such as a motor generator set 40 shown in the modification according to Fig. 3. When operating to transfer energy from an alternating current circuit 10 to a direct current circuit 12 the motor 41 of the motor generator set 40 is driven from the auxiliary winding 26 of the interphase transformer 20 and this motor 41 drives a generator 42 which supplies energy to the direct current circuit 12. On the other hand, if current is to be delivered from the direct current circuit 12 to the alternating current circuit 10, the direct current machine 42 operates as a motor driving the alternating current device 41 as a generator which supplies current to the auxiliary winding 26 of the interphase transformer 20.

Figure 5:
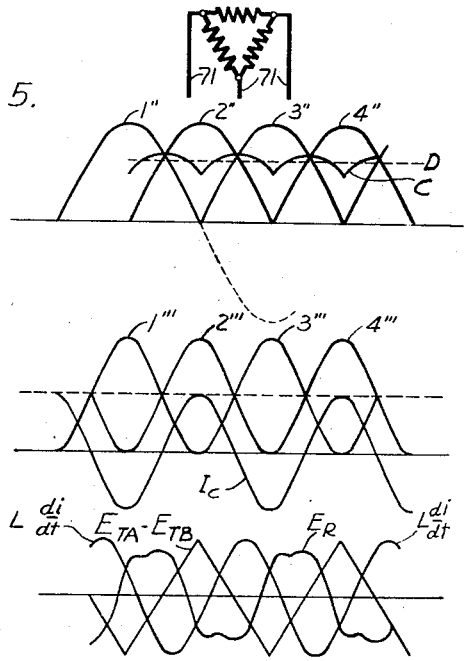
Fig. 5 is a graphical illustration of the currents and voltages produced in operation in the embodiment according to Fig. 3.

The fundamental principles of our invention are perhaps best understood by reference to Fig. 5 in which the respective current and voltage characteristics of the system are graphically illustrated. For simplicity of illustration, the voltage-current diagrams of the system of Fig. 3 are given, although the relations hold good for any double n-phase system.

The anode potentials of valves 1', 2', 3', 4' are indicated as waves 1'', 2'', 3'', 4'' and the cathode potential is indicated at C which produces the direct current voltage D. If we draw sufficient current $I_c$ from the interphase winding 20 to cause the load current to swing from A to B, then the anode currents will be 1''', 2''', 3''', 4'''. Each anode current reaches zero at the instant when no voltage is present across the transformer terminals, and the negative voltage on the anode increases along the sine wave instead of suddenly as in previous systems.

The current wave $I'''$ is no longer rectangular as indicated by dotted waves as in previous converters but is substantially of sine wave form. The power factor is also corrected.

The voltage wave $E_R$ necessary across the interphase winding to cause the current $I_c$ to flow is derived at the bottom of Fig. 5. The sum of the voltage around the circuit from the cathode through A, the interphase winding 20 and B must be zero. The difference in the phase voltages is plotted as $E_{TA}-E_{TB}$. The total inductive voltage is $$L\frac{di}{dt}$$

hence the interphase voltage $E_R$ must equal the other two as shown.

On account of the leakage reactance of the transformers, $E_R$ is not in exact phase with the current $I_c$ but slightly lags it. When the harmonic power is absorbed by a synchronous machine, the machine excitation can be adjusted to secure the exact phase relation desired so that the converter draws a unity power factor load from the alternating current system. When a valve type device is utilized to transfer the harmonic power, this slight advantage is lost, however, the operation is greatly improved over the normal double n-phase system.

For the double bi-phase system of Fig. 3, the kva of the harmonic power transfer system in terms of the direct current power is $$\frac{kva}{kw}=\tfrac{1}{2}\times .707\times 1.11=37\%$$

If double 3 $\phi$ is used, this reduces to 18%.

Because of the improved commutation conditions, the converter used in the circuit will handle at least four times the load at which they will operate satisfactorily in previous circuits while the total power transferred by a double 3 $\phi$ system would be 118% of the power handled by the converter because the power drawn at harmonic frequency is directly used.

Figure 4:
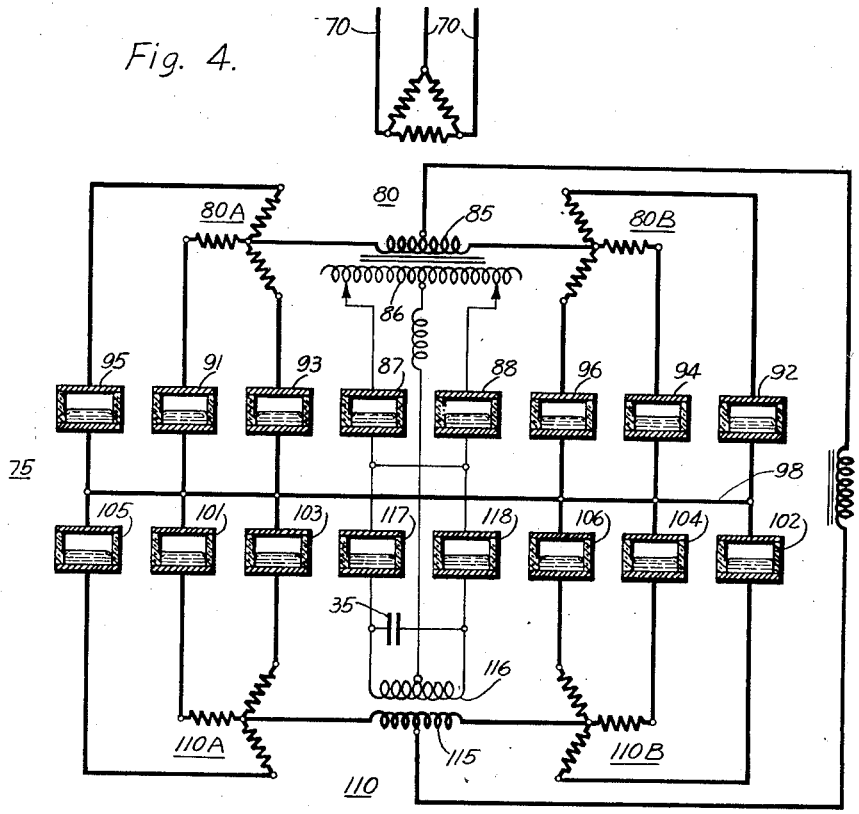
Fig. 4 is a schematic illustration of a frequency changer embodying our invention.

In Fig. 4 is shown a preferred embodiment of a frequency changer according to our invention. Our frequency changer in effect combines two converters constructed according to our invention. Two alternating-current lines 70, 71 are connected by means of the converter 75, which in effect comprises a transformer 80 connected to the line 70 having two secondary winding groups 80A and 80B connected by an interphase winding 85 with which is associated a winding 86 for withdrawing power which is fed through valves 87, 88 while the main valves 91 to 96 inclusive are fed by the secondary winding groups 80A and 80B.

The output of the valves 91 to 96 inclusive, is thus fed to an intermediate bus 98 and from the bus 98 to the second group of valves 101 to 106 inclusive, connected to the primary group windings 110A and 110B of the load transformer 110 connected to the load circuit 71.

The primary groups 110A and 110B are separated by the interphase winding 115 having an auxiliary winding 116 to which energy is supplied by valves 117 and 118, preferably directly connected to the valves 87 and 88 so that the energy withdrawn from the winding 85 is directly supplied to winding 115. However, by properly selecting the turns of the windings 86 and 116 the energy withdrawn from winding 85 may be delivered to the bus 98 and the energy required by winding 115 drawn from bus 98.

The valves 1 to 6, 91 to 96 and 101 to 106, inclusive may be provided with any suitable form of control; however, we prefer to use make-alive type valves. As the method of control is not necessary to an understanding of our invention, it has been omitted from the drawings for purpose of clearness.

A frequency changer according to our invention not only draws a substantially unity power factor load from the supply circuit but it has an additional advantage over frequency changers as heretofore constructed.

In frequency converters of previously known types, it is essential to reduce the output voltage as the frequency is reduced (as for instance when starting and alternating current motor as reduced frequency). As the frequency reduction continues the voltage becomes too low to commutate the tubes and it becomes necessary to provide special means for commutating the valves at low frequency. This problem is easily solved in the converter according to our invention simply by reducing the voltage output of the main supply transformer, but leaving the voltage applied to the interphase windings at normal value. Thus, commutation will take place regardless of frequency and load voltage.

For purpose of illustration, we have shown preferred embodiments of our invention. However, it will be apparent to those skilled in the art that many changes and modifications can be made therein without departing from the true spirit of our invention or the scope of the appended claims.

We claim as our invention:

1. An electrical conversion system, for transferring energy between an alternating and a direct-current circuit, a converter comprising a plurality of groups of electric valves, a transformer for connecting said valves to the circuits, a plurality of winding groups in said transformer, each of said winding groups being connected to one of said valve groups, an intermediate winding connected between said winding groups, an auxiliary winding inductively associated with said intermediate winding and means connected to said auxiliary winding for transferring energy between said intermediate winding and one of said circuits, and means connected to said auxiliary winding for supplying wattless current to said intermediate winding.

2. An electrical conversion system comprising a plurality of electrical circuits, a plurality of electric valves for transferring energy between said circuits said valves being arranged in at least two groups, a transformer having at least two winding groups, said winding groups being connected to said valve groups, an intermediate winding connected between said winding groups, an auxiliary winding inductively associated with said intermediate winding, and means connected to said auxiliary winding for compelling crisscrossed commutation between the valve groups.

3. An electrical conversion system comprising a plurality of electrical circuits, a plurality of electric valves for transferring energy between said circuits, said valves being arranged in two groups, a transformer having two winding groups, said winding groups being connected to said valve groups, an intermediate winding connected between said winding groups, an auxiliary winding inductively associated with said intermediate winding, and auxiliary electric valves connected to said auxiliary winding for transferring real power between said intermediate winding of one of said circuits.

4. An electrical conversion system for transferring energy between two electrical circuits, comprising a converter having a plurality of electric valves, a transformer for connecting said converter to said circuits, a winding connected between said transformer and one of said circuits, an auxiliary winding associated with said first-mentioned winding, and means associated with said auxiliary winding for transferring power between said winding and one of said circuits, the power transferred by said means being of the order of 18% of the power transferred by said valves.

5. In a valve type converter having at least two n-phase winding groups and an intermediate winding normally providing multi n-phase operation of the converter a control system for cylically changing the method of operation of the converter comprising a winding inductively associated with the intermediate winding and an auxiliary converter for withdrawing power from said intermediate winding at harmonic frequency.

6. An electrical conversion system, for transferring energy between an n-phase alternating current circuit and a direct current circuit, comprising a multi-valve converter, a transformer having a winding connected to the alternating current line, a plurality of n-phase windings connected to the valves of the converter, coupling means between said n-phase windings for normally procuring multiple n-phase operation of the converter and an auxiliary converter for transferring power between said coupling means and one of said circuits for controlling the commutating characteristics of the converter.

7. An electrical translating system comprising an n-phase alternating current circuit, a second electrical circuit a valve type converter having its valves arranged in a plurality of n-phase groups, a transformer having a plurality of n-phase winding sections corresponding to the valve groups, a winding interconnecting said n-phase winding sections, means for transferring rear power from said interconnecting winding cyclically reducing the current in the n-phase winding sections to a value which facilitates the commutation between phases of the n-phase group.

8. An electrical translating system for transferring electrical energy between substantially independent electrical circuits comprising a plurality of electric valves, a transformer interconnecting said circuits, said transformer having a plurality of n-phase winding groups, an interphase winding connected between said winding groups for producing normal multi n-phase operation of said valves, a plurality of auxiliary valves connected between said interphase winding and one of said circuits, said valves transferring real power between said interphase winding and said circuit for cyclically and successively transferring the current from the respective n-phase winding groups.

9. An electrical translating system for transferring energy between two substantially independent electrical circuits comprising a plurality of electric valves, a transformer connected to each of said circuits, said transformer having a plurality of n-phase winding groups connected to said valves, an interphase winding interconnecting said n-phase winding groups, said interphase winding normally producing multi n-phase operation of said valves, means for transferring real power between said interphase winding and one of said circuits for cyclically changing the normal mode of operation whereby the commutation between the succeeding valves of the several n-phase groups occurs at substantially zero current.

10. In an electrical translating system for transferring energy between two substantially independent electrical circuits, a plurality of electric valves, a transformer having a plurality of n-phase winding sections connected to said valves, an interphase winding connected between said winding sections and means for transferring real power from said interphase winding to one of said circuits for suppressing the harmonic voltages applied to the valves undergoing commutation.

11. In an electrical translating system for transferring energy between two substantially independent electrical circuits, a plurality of electric valves, a transformer having a plurality of n-phase winding sections connected to said valves, an interphase winding connected between said winding sections, an auxiliary converter associated with said interphase winding and one of said circuits for transferring power therewith at the normal frequency established in said winding whereby at commutation of the valves the back voltage is applied at the fundamental frequency applied to the n-phase windings.

12. A vapor electric converter for transferring energy between two substantially independent electrical circuits comprising a plurality of electric valves, a transformer having a plurality of n-phase winding sections connected to said valves, an interphase winding connected between said n-phase sections for normally producing multi n-phase operation of said converter and means for transferring power between said interphase winding and one of said circuits whereby at the termination of the conducting interval of any valve of the converter the back voltage is applied at substantially sine wave form.

13. A vapor electric converter for transferring energy between two substantially independent electrical circuits comprising a plurality of electric valves, a transformer having a plurality of n-phase winding sections connected to said valves, an interphase winding connected between said n-phase sections for normally producing multi n-phase operation of said converter and means for transferring power between said interphase winding and one of said circuits whereby the commutation of the valves of any n-phase group occurs with substantially zero back voltage.

14. A vapor electric converter for transferring energy between two substantially independent electrical circuits comprising a plurality of electric valves, a transformer having a plurality of n-phase winding sections connected to said valves, an interphase winding connected between said n-phase sections for normally producing multi n-phase operation of said converter and means for transferring power between said interphase winding and one of said circuits whereby the voltage applied to valves approaches zero at the instant of commutation.

LEON R. LUDWIG.
HERBERT A. ROSE.